(12) United States Patent
Meirelles Tomanik et al.

(10) Patent No.: US 9,995,393 B2
(45) Date of Patent: Jun. 12, 2018

(54) PISTON RING AND METHOD FOR MANUFACTURING SAME

(71) Applicants: Mahle Metal Leve S/A, Jundiai-Sp (BR); Mahle International GmbH, Stuttgart (DE)

(72) Inventors: Antonio E. Meirelles Tomanik, Sao Paulo (BR); Daniel Lopez, Stuttgart (DE)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 317 days.

(21) Appl. No.: 14/909,296

(22) PCT Filed: Jul. 31, 2014

(86) PCT No.: PCT/IB2014/001436
§ 371 (c)(1),
(2) Date: Feb. 1, 2016

(87) PCT Pub. No.: WO2015/015283
PCT Pub. Date: Feb. 5, 2015

(65) Prior Publication Data
US 2016/0169387 A1    Jun. 16, 2016

(30) Foreign Application Priority Data
Aug. 1, 2013  (BR) .............................. 102013019686

(51) Int. Cl.
*F16J 9/26*   (2006.01)
*F16J 9/14*   (2006.01)
(Continued)

(52) U.S. Cl.
CPC ............... *F16J 9/26* (2013.01); *C23C 30/005* (2013.01); *F16J 9/12* (2013.01); *F16J 9/14* (2013.01); *F16J 9/28* (2013.01)

(58) Field of Classification Search
CPC .. F16J 9/12; F16J 9/14; F16J 9/16; F16J 9/18
See application file for complete search history.

(56) References Cited

U.S. PATENT DOCUMENTS

| | | | | |
|---|---|---|---|---|
| 3,697,091 A | * | 10/1972 | Prasse | F16J 9/26 277/442 |
| 3,794,334 A | * | 2/1974 | Prasse | F16J 9/26 277/442 |

(Continued)

FOREIGN PATENT DOCUMENTS

| | | |
|---|---|---|
| CN | 201269146 Y | 7/2009 |
| DE | 102007029992 A1 | 1/2009 |

(Continued)

OTHER PUBLICATIONS

English abstract for JP2008057671.
(Continued)

*Primary Examiner* — Nicholas L Foster
(74) *Attorney, Agent, or Firm* — Fishman Stewart PLLC

(57) ABSTRACT

A piston ring for a piston of an internal combustion engine or a compressor may include a substantially annular shaped body defining an inner surface facing towards a groove configured to receive the body, an upper surface facing towards a combustion chamber and extending substantially at a right angle to the inner surface, and a lower surface disposed substantially opposite the upper surface. A layer of thermally insulating coating may be disposed at least partially on at least one of the inner surface, the upper surface and the lower surface.

12 Claims, 4 Drawing Sheets

(51) Int. Cl.
    *F16J 9/12*         (2006.01)
    *F16J 9/28*         (2006.01)
    *C23C 30/00*      (2006.01)

(56) References Cited

U.S. PATENT DOCUMENTS

| | | | | |
|---|---|---|---|---|
| 4,669,369 | A | * | 6/1987 | Holt ............... F02F 7/0085 |
| | | | | 123/193.6 |
| 5,281,484 | A | | 1/1994 | Tank et al. |
| 5,743,012 | A | | 4/1998 | Adams et al. |
| 6,025,065 | A | | 2/2000 | Claussen et al. |
| 2005/0016489 | A1 | * | 1/2005 | Endicott ............... F02F 1/20 |
| | | | | 123/193.2 |
| 2010/0187765 | A1 | | 7/2010 | Hoppe et al. |
| 2011/0312860 | A1 | | 12/2011 | Mathew et al. |
| 2012/0023931 | A1 | * | 2/2012 | House ............... F01D 25/16 |
| | | | | 60/598 |

FOREIGN PATENT DOCUMENTS

| | | | |
|---|---|---|---|
| DE | 102007035502 | A1 | 2/2009 |
| EP | 067327 | A1 | 12/1982 |
| EP | 0595075 | A2 | 5/1994 |
| EP | 0645463 | A2 | 3/1995 |
| EP | 2518373 | A1 | 10/2012 |
| JP | 2003-042294 | A | 2/2003 |
| JP | 2004-116648 | A | 4/2004 |
| JP | 2004-156472 | A | 6/2004 |
| JP | 2004-340075 | A | 12/2004 |
| JP | 2008-057671 | A | 3/2008 |
| JP | 2008-069884 | A | 3/2008 |
| WO | WO-95/32314 | A1 | 11/1995 |
| WO | WO-02/088407 | A1 | 11/2002 |
| WO | WO-2008016009 | A1 | 2/2008 |
| WO | WO-2008016010 | A1 | 2/2008 |
| WO | WO-2009069703 | A1 | 6/2009 |
| WO | WO-2009069762 | A1 | 6/2009 |

OTHER PUBLICATIONS

English abstract for JP2008069884.
English abstract for JP2004156472.
English abstract for JP2003042294.
English abstract for JP2004340075.
English abstract for JP2004116648.
English abstract for CN-201269146.

* cited by examiner

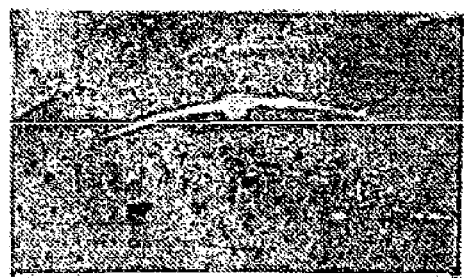
ΔT = 0°C    Fig. 3
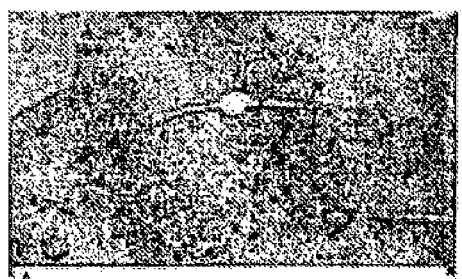
ΔT = 80°C    Fig. 4
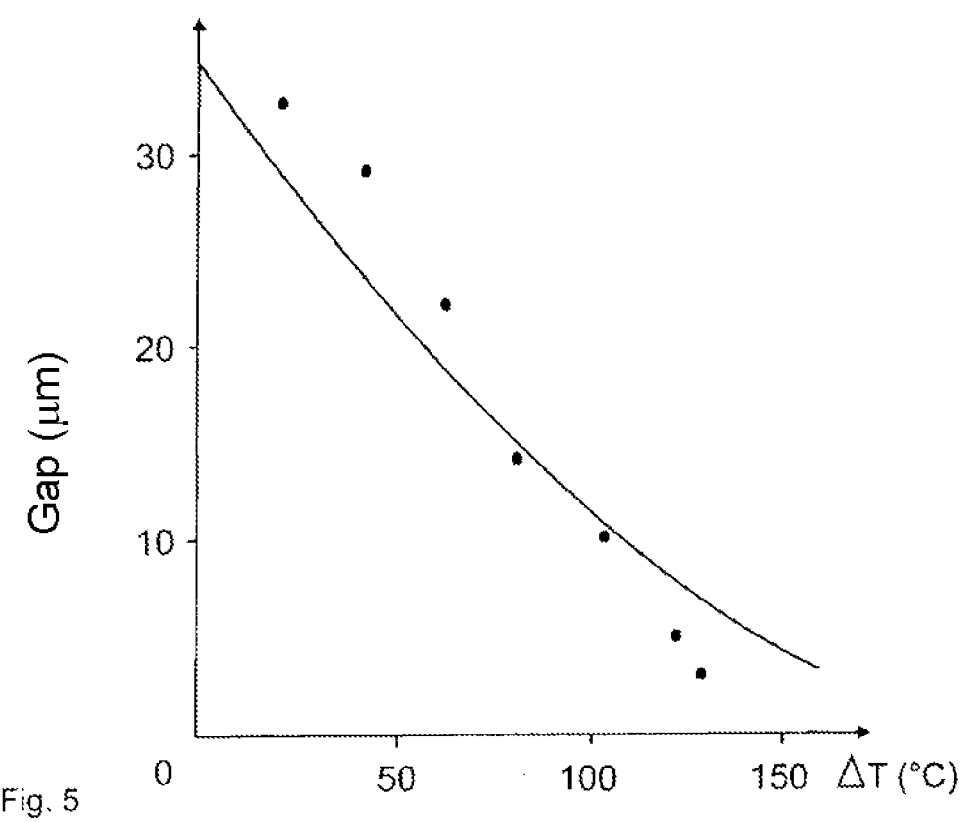
Fig. 5

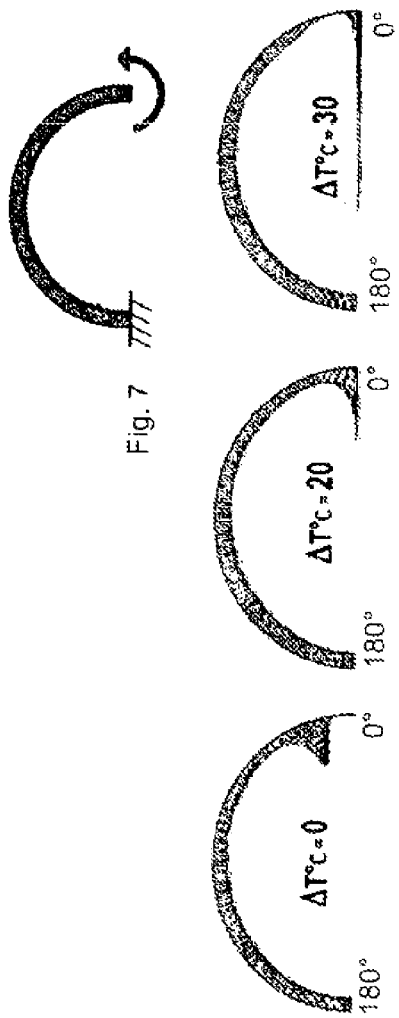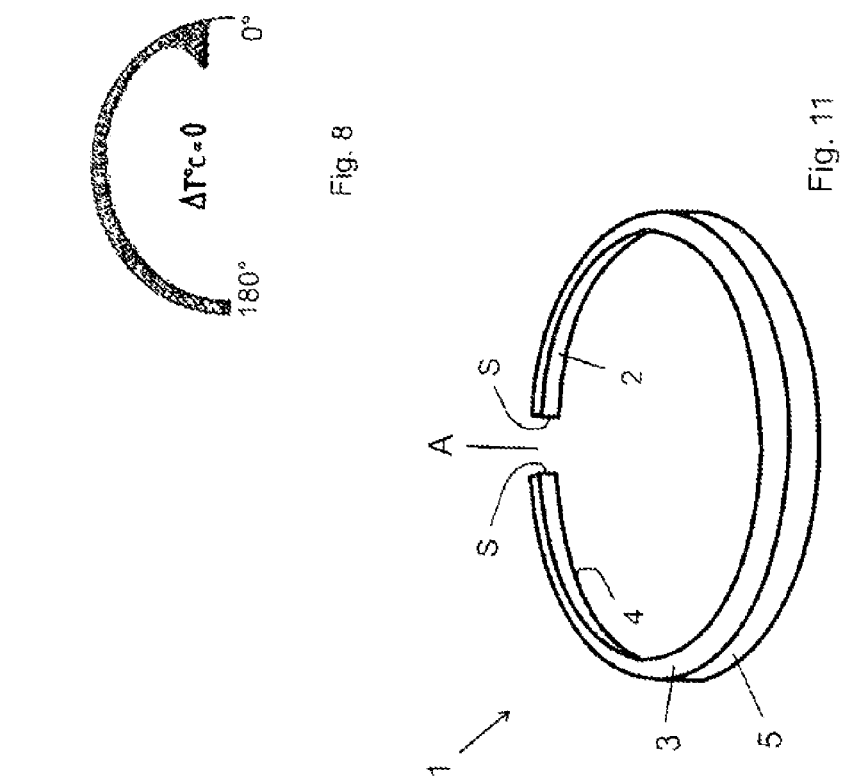

PISTON RING AND METHOD FOR MANUFACTURING SAME

CROSS-REFERENCE TO RELATED APPLICATIONS

This application claims priority to Brazilian Patent Application No. 10 2013 019686 0, filed Aug. 1, 2013, and International Patent Application No. PCT/IB2014/001436, filed Jul. 31, 2014, both of which are hereby incorporated by reference in their entirety.

TECHNICAL FIELD

This invention relates to a piston ring, especially intended for use in an internal combustion engine or compressor, provided with a heat barrier applied to at least part of the surface area of the ring, bringing about a reduction in the temperature of the ring and as a corollary less wear at the ends of the part (the tips).

This invention also relates to a process for manufacturing this piston ring.

BACKGROUND

Piston rings act as bridges for the transmission of heat between the piston and the cylinder liner, from which it is dissipated through fins or by transfer to water present in cooling channels.

The heat originating from explosion of the air-fuel mixture causes the piston ring to expand. As the ring acts as a "bridge" conducting heat between the piston and the block, the heat (and as a consequence the temperature) is greatest in the inner portion of the ring, so that it expands more than the outer portion. This difference in expansion is greater the greater the thermal gradient. The different expansion along the radial line of the ring has the effect that the radial pressure exerted by its free ends (tips) in contact with the cylinder wall increases excessively, undesirably increasing the rate of wear of the ring at that point.

Wear at the free ends has an adverse effect on the performance of the ring as regards sealing of the combustion chamber and/or control of the oil film and makes it necessary to develop techniques which maintain this at an acceptable level. In this respect, contrary to the present invention, the great majority of alternative solutions up to the present time have relied on an old paradigm according to which wear at the free ends was treated by the application of more highly developed coatings and/or by adjusting the geometrical format of the ring in such a way as to considerably reduce the radial pressure exerted by the free ends of the ring.

Japanese Patent Document JP 2008-057671 discloses a piston ring provided with inner peripheral portions made of a material having a lower thermal expansion coefficient than the material forming other portions of the ring. In this way the radial pressure exerted by the different portions of the ring is harmonized independently of the operating condition of the engine.

German Patent Document DE 10 2007 029992 relates to a piston ring in which the free ends comprise a material whose thermal expansion coefficient is lower than that of the rest of the ring, ensuring that the expansion, and therefore the radial pressure, increases less in this region. As a result of this, wear at the free ends is less than in comparison with a conventional ring.

Japanese Patent Document JP 2008-069884 relates to a combined piston ring for control of the oil film which ensures good performance at any operating temperature. For this the ring comprises a cooling element C positioned within the interior of the expanding element, which absorbs heat and therefore reduces the resulting radial deformation of the ring, in particular at the free ends.

Patent Document WO 2008/016010 relates to a piston ring to which the applied stress varies between low temperature low load conditions and high load and temperature conditions in such a way as to minimize friction losses and increase engine performance (less fuel consumption). To achieve this the ring is made of a titanium-tantalum shape-memory alloy comprising tantalum in a proportion of not less than 30% in moles and less than 40% in moles, the remainder being titanium and the inevitable impurities.

Patent Document WO 2008/016009 relates to a piston ring in which the applied stress varies between low temperature low load conditions and high load and temperature conditions in such a way as to minimize friction losses and increase engine efficiency (less fuel consumption). According to the document this is achieved through a shape memory alloy comprising 34.7 to 48.5% in moles of nickel, 9 to 22.5% in moles of either of the elements zirconium and hafnium and 1 to 30% in moles of niobium, the remainder being titanium and the inevitable impurities.

Patent Document WO 2009/069703 relates to a combination of a piston ring and a cylinder liner which satisfies a plurality of hardness and surface finish conditions so that linear expansion of the ring matches the linear expansion of the cylinder, thus ensuring the durability of the whole.

Patent Document WO 2009/069762 relates to a steel for the manufacture of piston rings and a piston ring manufactured therewith which ensures a thermal expansion coefficient that is very similar to that of an aluminum cylinder liner, making it possible to use this ring in aluminum liners with excellent results as far as sealing is concerned. The product (ring) comprises (by mass) 0.01% to 1.9% of carbon, 0.01% to 1.9% of silicon and 5.0% to 24.0% of manganese, the remainder being iron and the inevitable impurities. In addition to this the ring comprises 18.0% or less of chromium and/or 12.0% or less of nickel in addition to the essential elements above. In addition to this the product may contain 1% or less of aluminum and/or 0.3% or less of nitrogen, as well as one or more of the elements from niobium, titanium, zirconium, molybdenum and copper in a percentage of up to 4.0%.

German Patent Document DE 10 2007 035502 relates to a piston ring having an anti-wear coating formed of a material having a thermal conductivity of at least 180 W/(m·K), in which at least 5% by volume of the coating layer comprises an aluminum nitride.

Japanese Patent Document JP 4008327 relates to a piston ring comprising an outer metal ring on top of a resin ring. The resin ring acts to reduce/control thermal expansion of the ring, maintaining it at an acceptable value from cold starting of the engine up to operation at high rotation speeds.

Japanese Patent Document JP 2004-340075 relates to a piston ring of the oil scraper type in two parts which comprises two expansion rings, each formed of a specific material, one of shape-memory alloy with a thermal expansion coefficient which is different from the other one. In this way control of the percentage of thermal expansion of the ring is achieved in different motor operating situations.

Japanese Patent Document JP 2003-042294 relates to a piston ring to which a hard carbon coating is applied, and this, in addition to acting as an abrasion-resistant film, has a thermal expansion coefficient which is greater than or equal to [15×10$^{-6}$/° C.]. In this way suitable behavior of the ring as regards thermal expansion is achieved.

Japanese Patent Document JP 2004-156472 comprises an oil ring in three parts provided with a spacer comprising two members welded together, in which the second member comprises a material having a thermal expansion coefficient greater than that of the material comprising the first member. In this way the resulting ring has good performance in different engine operating situations.

Finally, American Patent Document US 2011/0312860 relates to a coating for covering components subject to wear and high operating temperatures, such as parts of gas turbines and piston rings. In addition to resisting operating abrasion this coating also acts as a thermal barrier to minimize loss of performance in high temperature operating situations.

Describing it in a generic manner, the coating disclosed in US 2011/0312860 comprises a hard ceramic phase, a metal phase having an adhesive function and a lubricating phase comprising a multi-component oxide. Nevertheless, in the description of this document there is no discussion about the properties of the coating with regard to reducing the thermal expansion occurring in the mechanical component to which it has been applied.

As will be seen, all the documents in the state of the art above, which are very representative of the state of the art for piston rings in internal combustion engines, are based on an earlier paradigm in which the material of the part is altered so that thermal expansion values lie within desired parameters, and none of them clearly discuss use of a thermal coating which acts to a greater or lesser extent as a thermal barrier.

No piston ring has yet been developed to reduce radial expansion of the ring, mainly in the region of the tips, thereby increasing the service life of the ring and minimizing the need to apply specific coatings which are more resistant to wear at the contact surface with the cylinder, through the application of an additional thermal coating (in addition to the anti-wear coating present in this type of component) in places where there is transfer of heat from the gases or the hottest parts of the piston to the ring (such as for example the contact faces between the ring and the piston).

SUMMARY

The object of this invention is a piston ring which is particularly intended for use in an internal combustion engine or compressor provided with a thermal barrier applied to at least part of the inner and/or upper and/or lower surfaces of one of the lateral ends close to the gap in the ring (tips), bringing about a reduction in the temperature of the ring and, as a corollary, less wear in that region.

Another object of this invention is a process for manufacture of the piston ring described above.

The objects of this invention are accomplished through a piston ring for use on the piston of an internal combustion engine or compressor, having a substantially annular shape defining an inner surface facing the groove, an upper surface facing the combustion chamber and substantially at right angles to the inner surface, and a lower surface which is substantially opposite the second surface, where a layer of thermally insulating coating is provided over at least part of the surface of the inner, upper or lower surface.

Thus the objects of this invention are accomplished through a process for the manufacture of a piston ring as described in the preceding paragraph which comprises the stage of applying a layer of thermally insulating coating onto at least part of the surface area of the inner, upper or lower surfaces of the ring.

BRIEF DESCRIPTION OF THE DRAWINGS

This invention will be described in greater detail below on the basis of an embodiment illustrated in the drawings. The figures show:

FIG. 3—is a photograph of a piston ring according to the state of the art in a test applying a thermal gradient and its effect on the change in the geometry of the ring at a temperature of 0° C.

FIG. 4—is a photograph of a piston ring according to the state of the art in a test applying a thermal gradient and its effect on the change of the geometry of the ring at a temperature of 80° C.

FIG. 5—is a graph illustrating the values obtained in the test applying a thermal gradient in FIGS. 3 and 4 and its effect on changing the geometry of the ring, and therefore in sealing the gap at the tips in relation to a ring belonging to the state of the art.

FIG. 7—is a diagrammatical view of the bending moment applied to the free end of a piston ring due to the temperature gradient.

FIG. 8—is a diagrammatical view of the pressure exerted on the outer surface of the ring for a temperature gradient of 0° C.

FIG. 9—is a diagrammatical view of the pressure exerted on the outer surface of the ring for a temperature gradient of 20° C.

FIG. 10—is a diagrammatical view of the pressure exerted on the outer surface of the ring for a temperature gradient of 30° C.

FIG. 11—is a diagrammatical perspective view of the piston ring according to this invention.

DETAILED DESCRIPTION

Those skilled in the art know that the thermal expansion of a piston ring, which is inevitable when an internal combustion engine equipped with it is in operation, changes the value of the radial pressure exerted at its free ends to a greater or lesser extent.

If a given maximum value (a given design parameter) is reached or exceeded, this excessive increase in the value of the radial pressure can prematurely wear the layer of coating at the free ends of the ring, reducing its efficiency as regards compression values and/or maintenance of the oil film in that portion of the cylinder wall.

This occurs because piston rings operate as bridges for the transmission of heat between the piston and the cylinder jacket, from which it is dissipated through fins or by transfer through water present in channels and as a result of this the heat (and as a consequence the temperature) is greatest in the inner portion of the ring, so that it expands more than the outer portion. Heat has the effect that the piston ring expands, and this expansion is greater the greater the thermal gradient. Expansion of the ring causes the radial pressure exerted by its free ends (tips) in contact with the cylinder wall to increase excessively, undesirably increasing the rate of wear of the ring at these locations.

Wear at the free ends has an adverse effect on the performance of the ring as regards sealing of the combustion chamber and/or control of the oil film and makes it necessary to develop techniques which maintain this at an acceptable level. In this respect, contrary to this invention, the great majority of alternative solutions use an old paradigm in which the material of the part is altered so that thermal expansion values remain within desired parameters.

This problem is indirectly demonstrated from the performance of a test according to standard SAE 831283, in which any ring which does not have contact at the tip regions (that is creating a gap—tips radial clearance) undergoes different thermal gradients. The greater the thermal gradient the less the clearance, and this can be seen from a comparative examination of FIGS. 3 and 4.

The graph illustrated in FIG. 5 shows the considerable reduction in clearance in the test as the temperature gradient increases.

Figure 6:
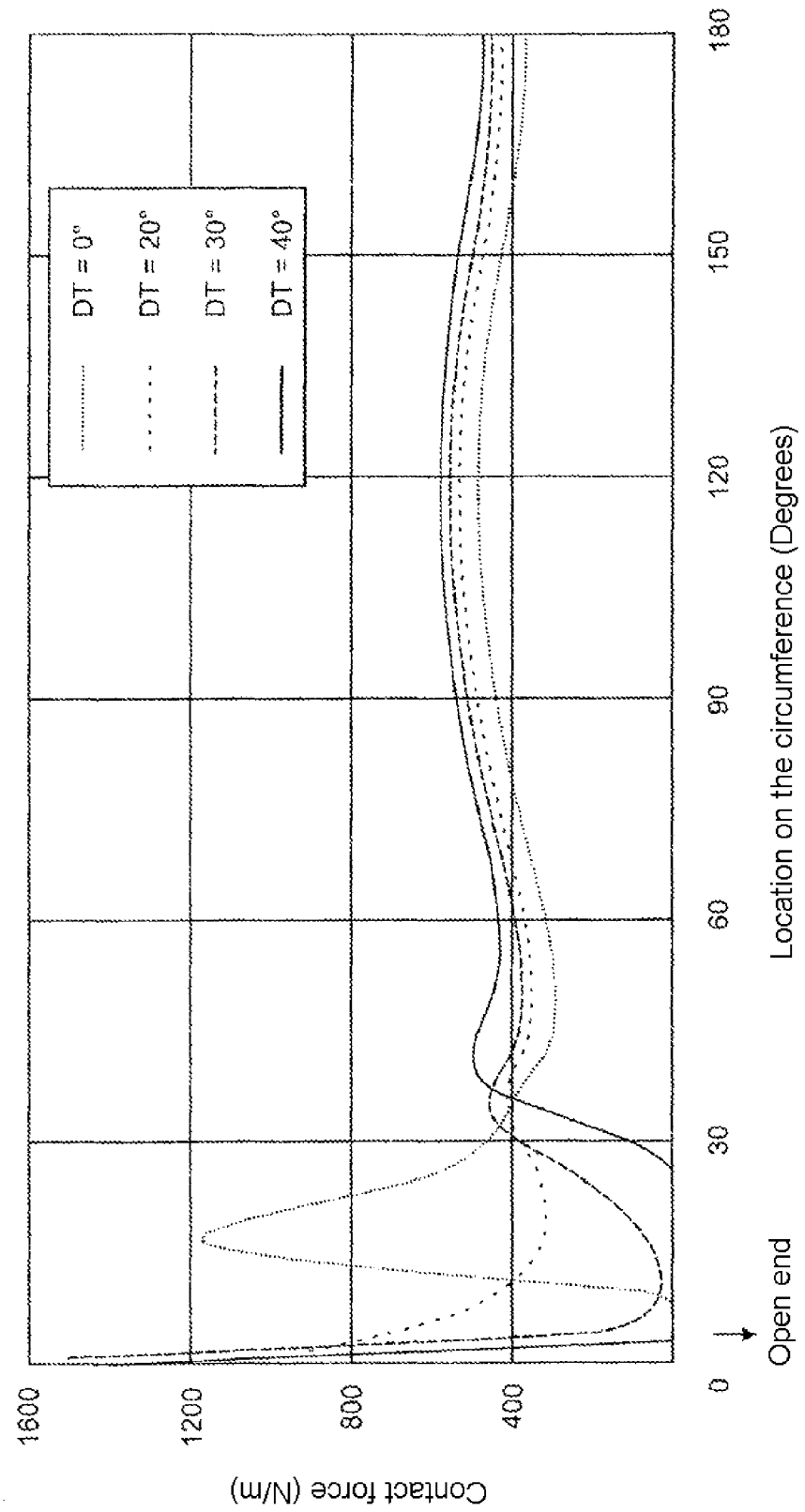
FIG. 6—is a graph illustrating the effect of the radial temperature gradient on ring contact pressure throughout its perimeter.

FIG. 6 shows a graph corresponding to a simulation of the effect of temperature gradient on the value of the radial contact pressure of a piston ring along its perimeter. In this graph, in which the free end of the ring (tip) is considered to be the 0° measurement it can clearly be seen that in the region of the gap (0°) the value of the contact force is zero when the thermal gradient is 0° C. and increases considerably when the gradient increases to 20° C., 30° C. or when a gradient of 40° C. is maintained.

In this respect FIGS. 8 to 10 show the values of the graph in FIG. 6 within the body of the ring for each thermal gradient. Examining the figures comparatively, the increase in pressure exerted on the outer surface of the ring in gap position A (0°) as the thermal gradient increases will be clearly seen.

As this situation is tiresome and unavoidable, the applicant has sought a new design and development paradigm to deal with this problem. Instead of altering the coating in the region of the tips or altering the basic material along the body of the ring to reduce pressure in the vicinity of the tips, the applicant has developed a completely new, innovative and efficient solution which is described below.

Figure 1:
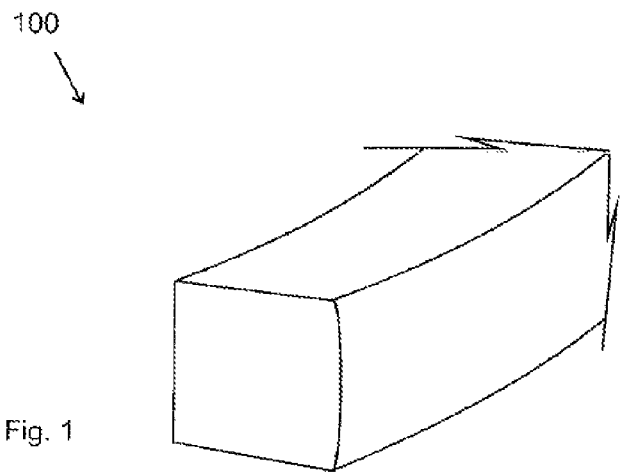
FIG. 1—is a diagrammatical perspective view of a piston ring according to the state of the art in the vicinity of one of its free ends.
Figure 2:
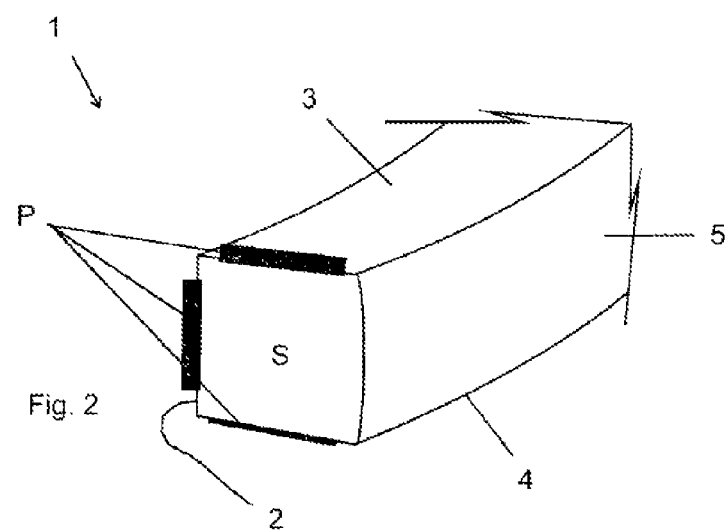
FIG. 2—is a diagrammatical perspective view of a possible embodiment of a piston ring according to this invention in the vicinity of one of its free ends.

In essence, piston ring 1 according to this invention, which has been designed for use in a groove in a piston of an internal combustion engine or compressor (not illustrated), and viewed in the position illustrated in FIG. 2, comprises an inner surface 2 facing the groove, an upper surface 3 which substantially faces the combustion chamber and is substantially at right angles to inner surface 2, and a lower surface 4 which is substantially opposite upper surface 3.

Furthermore, as regards its geometrical description, ring 1 has a substantially annular shape and defines a gap A between two free ends, each defining a respective transverse terminal surface S, as illustrated in FIG. 11.

Preferably ring 1 is a compression ring (or ring in the first groove) and also comprises an outer surface 5 which is substantially opposite inner surface 2 and faces the cylinder lining. In the great majority of applications outer surface 5 receives an abrasion-resistant protective coating, given that it will wear in contact with the lining over millions of cycles.

Obviously ring 1 may have other configurations, such as that of a ring in the second groove, a ring in a piston compressor or any other configuration.

In the region of the gap in ring A each of the free ends defines the terminal transverse surface S mentioned which in essence corresponds to the profile of the transverse cross-section of the part.

Whatever its specific constitution, and whatever basic material used to manufacture it, an essential characteristic of ring 1 according to this invention is the fact that at least part of the surface in the regions adjacent to its free ends (tips) is provided with a thermally insulating layer P. Describing it in greater detail, a layer of thermally insulating coating P is provided over at least part of the surface area of the inner and/or upper and/or lower surfaces 2, 3, 4.

In addition, regardless of its specific constitution, and whatever the base material used to manufacture it, an optional characteristic of ring 1 according to this invention is the fact that a layer of thermally insulating coating P is provided on at least one terminal transverse surface S.

Variant non-limiting configurations may exist, in which a layer of thermally insulating coating P is provided on at least part of the surface of inner surface 2, at least part of the surface of inner surface 2 and at least part of the surface of upper surface 3, or only on at least one terminal transverse surface S, and other possible combinations of these three possibilities.

A principal characteristic of coating layer P is the fact that it is thermally insulating, to prevent the heat originating from the combustion gases resulting from explosion of the air-fuel mixture from causing a high thermal gradient in the ring, bringing about an increase in the pressure exerted on the outer surface of the ring at the location of the gap to the extent that it causes more accelerated wear of that portion of the ring.

Preferably but without being limiting, coating layer P comprises a material commonly known as YSZ, or yttrium stabilized zirconia. YSZ is a ceramic material based on zirconium oxide which offers good performance in this application, in which the crystalline structure of the zirconium oxide ($ZrO_2$, known as zirconia) is kept stable at ambient temperature through the addition of yttrium oxide ($Y_2O_3$, known as yttria).

Alternatively but not in any limiting way, other ceramic materials which are necessary or desirable, such as zirconia stabilized with calcium, magnesium, cerium, hafnium or aluminum, may be used. Alternatively, partially stabilized zirconia, known by those skilled in the art as PSZ (partially stabilized zirconia) or even other types of materials, which may or may not be polymers, may be used, all these being included within the scope of the protection of the appended claims.

Regardless of its specific composition, coating layer P may be applied by means of any process, such as for example a process for the application of any coating, in the form of paint or any other.

Coating layer P may be applied to part of (or all of) inner surface 2 to prevent the transfer of any heat from the combustion gases, part of upper surface 3, for the same purpose, and part of lower surface 4, in the situation where the groove in the piston has a temperature higher than that of the ring.

The application of coating layer P to inner surface 2 and/or upper surface 3 and/or lower surface 4 and/or terminal transverse surfaces S reflects the heat present there, preventing it from being absorbed by the body of the ring, which is especially important in the regions adjacent to the free ends (tips) of the ring. In this way the thermal gradient is reduced and as a consequence there is no undesirable increase in the pressure exerted on the outer surface of the ring at the location of the gap.

When applied, coating layer P is applied to inner surface 2 to reduce the transfer of heat from the hot gases resulting from the air-fuel mixture to the piston ring. The same objective is accomplished when a coating layer P is applied to upper surface 3, which faces the combustion chamber and is therefore at least partly in contact with the said hot gases.

Finally, coating layer P may be applied to lower surface 4 in situations where the groove in the piston has a temperature higher than that of the ring and therefore thermal insulation is useful to reduce the temperature gradient in the ring.

Through development of piston ring 1 according to this invention there is hardly any reduction in the phenomenon of spalling, but there is a reduction in scuffing due to the reduced temperature of the ring, which also acts to reduce wear on the piston groove. In addition to this there is a reduction in wear on the cylinder wall and a reduction in the working temperature of the lubricating oil, reducing the rate at which it is degraded.

Also novel and imbued with invention is a process for the manufacture of this piston ring 1, which comprises the stage of applying the layer of thermally insulating coating P to at least part of the surface of inner and/or upper and/or lower surfaces 2, 3, 4 of the ring.

Preferably, or possibly, the process also comprises a stage of applying layer of thermally insulating coating P to at least a part of the surface of one of the terminal transverse surfaces S.

Now that a preferred embodiment has been described it should be understood that the scope of this invention covers other possible variations, being only limited to the content of the appended claims, including possible equivalents.

The invention claimed is:

1. A piston ring for a piston of an internal combustion engine or compressor, comprising:
    a substantially annular shaped body defining an inner surface facing a groove configured to receive the body, an upper surface facing towards a combustion chamber and extending substantially at a right angle to the inner surface, a lower surface disposed substantially axially opposite the upper surface, and an outer surface radially opposite and facing away from the inner surface and extending between the upper surface and the lower surface; and
    a layer of thermally insulating coating disposed at least partially on at least one of the inner surface, the upper surface and the lower surface,
    wherein the layer of thermally insulating coating is a ceramic coating that includes stabilized zirconia and is not disposed on the outer surface of the piston ring.

2. The piston ring as claimed in claim 1, wherein the body includes a gap defining two circumferential free ends, and each of the two free ends having a respective terminal transverse surface, wherein the layer of thermally insulating coating is disposed on at least part of the surface of at least one of the respective terminal transverse surfaces.

3. The piston ring as claimed in claim 1, wherein the stabilized zirconia is yttrium stabilized zirconia (YSZ).

4. The process as claimed in claim 2, wherein the stabilized zirconia is yttrium stabilized zirconia (YSZ).

5. A process for manufacturing a piston ring, comprising:
    forming a substantially annular shaped body having an inner surface configured to face a piston ring groove, an upper surface facing towards a region of combustion and extending substantially orthogonal to the inner surface, a lower surface disposed substantially axially opposite the upper surface, and an outer surface radially oppositely facing away from the inner surface and extending between the upper surface and the lower surface; and
    applying a thermally insulating coating to at least part of at least one of the inner surface, the upper surface, and the lower surface,
    wherein the thermally insulating coating is a ceramic coating that includes stabilized zirconia and is not disposed on the outer surface of the piston ring.

6. The process as claimed in claim 5, wherein forming the body includes providing a gap defining two circumferential free ends each having a terminal transverse surface, and further including applying a layer of the thermally insulating coating to at least part of the terminal transverse surface of at least one of the two free ends.

7. The process as claimed in claim 6, wherein the stabilized zirconia is yttrium stabilized zirconia (YSZ).

8. The process as claimed in claim 5, wherein the stabilized zirconia is yttrium stabilized zirconia (YSZ).

9. A piston ring for a piston of an internal combustion engine or compressor, comprising:
    an annular body having an inner surface configured to face a piston ring groove, an upper surface facing towards a combustion chamber and extending transversely to the inner surface, a lower surface disposed axially opposite the upper surface, and an outer surface radially opposite and facing away from the inner surface and extending between the upper surface and the lower surface; and
    a coating layer of a ceramic material disposed at least partially on at least one of the inner surface, the upper surface and the lower surface,
    wherein the coating layer includes stabilized zirconia and is not disposed on the outer surface of the piston ring.

10. The piston ring of claim 9, wherein the stabilized zirconia is yttrium stabilized zirconia (YSZ).

11. The piston ring as claimed in claim 9, wherein the body includes a gap defining two circumferential free ends each having a terminal transverse surface, and wherein the coating layer of ceramic material is further disposed on the terminal transverse surface of one of the two free ends.

12. The piston ring of claim 11, wherein the stabilized zirconia is yttrium stabilized zirconia (YSZ).

* * * * *